C. H. KILGORE.
AUTOMATIC BRAKE.
APPLICATION FILED MAY 23, 1917.
1,254,605.
Patented Jan. 22, 1918.
2 SHEETS—SHEET 1.
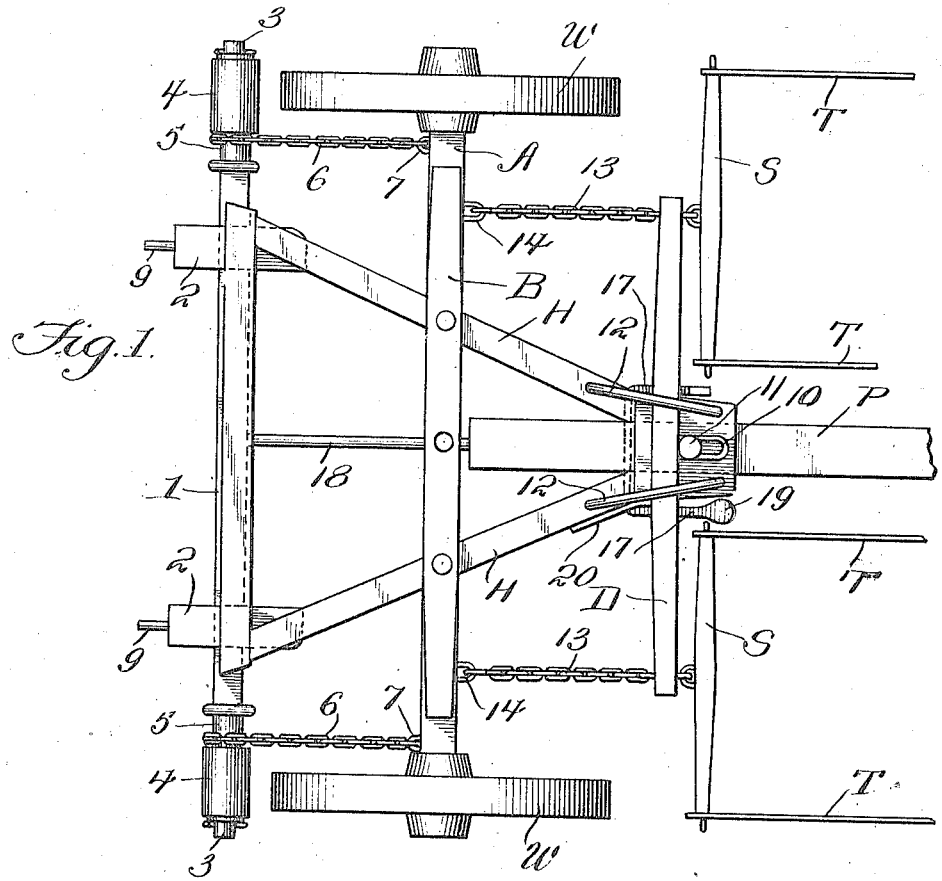
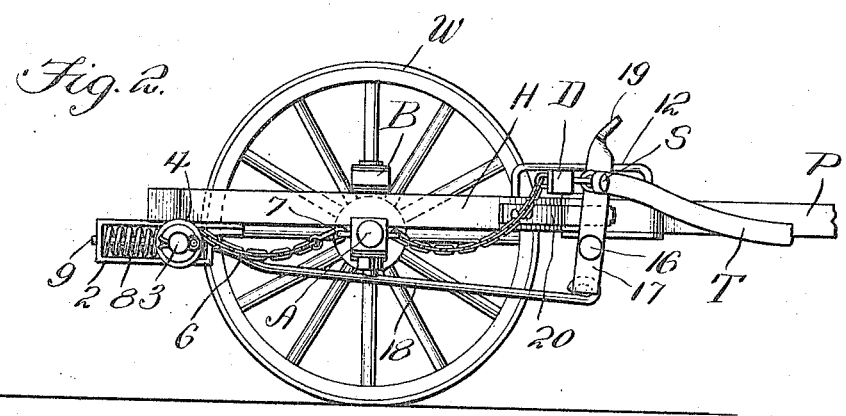
WITNESSES
INVENTOR
C. H. Kilgore
BY Victor J. Evans
ATTORNEY

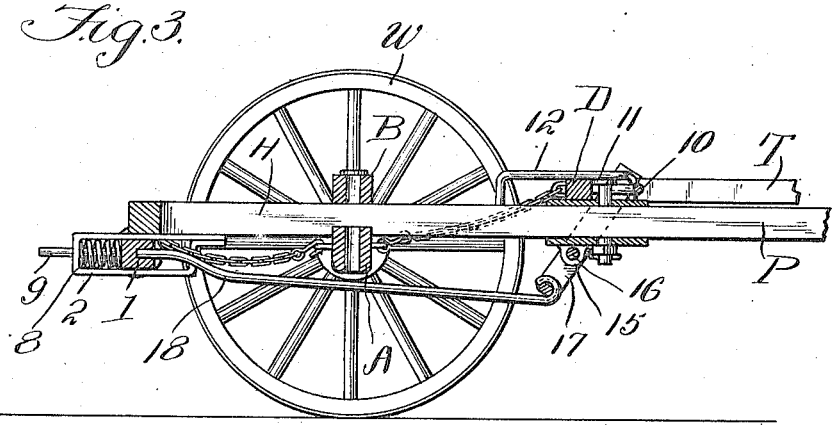
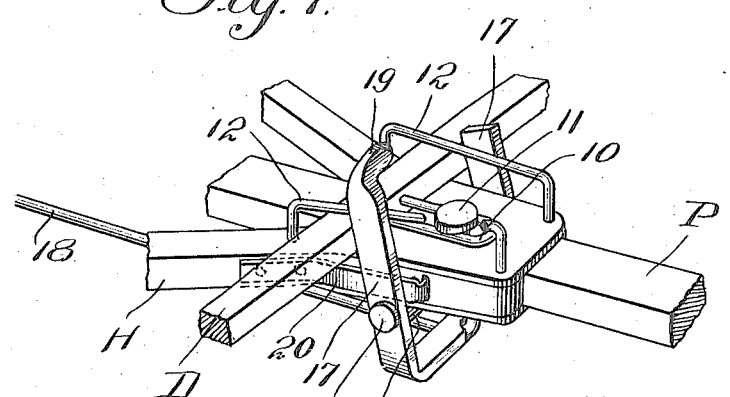
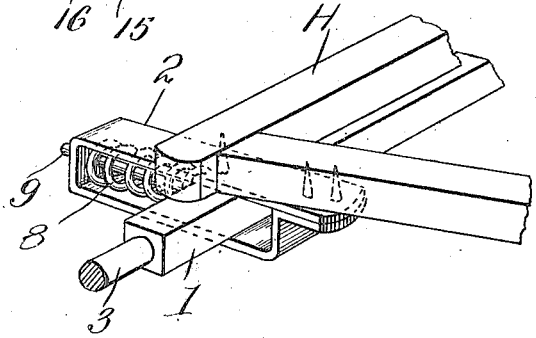

UNITED STATES PATENT OFFICE.

CHARLES H. KILGORE, OF PALMERSVILLE, TENNESSEE.

AUTOMATIC BRAKE.

1,254,605.  Specification of Letters Patent.  Patented Jan. 22, 1918.

Application filed May 23, 1917. Serial No. 170,512.

*To all whom it may concern:*

Be it known that I, CHARLES H. KILGORE, a citizen of the United States, residing at Palmersville, in the county of Weakley and State of Tennessee, have invented new and useful Improvements in Automatic Brakes, of which the following is a specification.

This invention relates to carriages and wagons, and more especially to brakes; and the object of the same is to produce a brake of the rolling drum type which is automatically applied when the horses of a team cease to pull on the traces, but which is not even then applied with much force until the wheels have turned for a short distance. In other words, the invention contemplates the employment of brake mechanism which is applied effectively by the rotation of the wheels in contact with friction drums, together with mechanism for producing such contact only when one or both horses cease to pull.

Details are set forth in the following specification, and reference is made to the accompanying drawings wherein:—

Figure 1 is a plan view of this structure which involves only the front wheels of an ordinary wagon, this view showing the hounds supporting the brake proper, and the doubletree and swingletrees and illustrating the traces as under tension so that brakes are not applied.

Fig. 2 is a side elevation with the near wheel dotted, showing the traces as slack and the mechanism in such position that the friction drum is in contact with the tire of the wheel, but the brake is not yet applied with much force.

Fig. 3 is a central longitudinal section showing more clearly the action of the push rod, and this view illustrates the rock lever as tilted forward as by tension on the traces so that the push rod disengages the friction drums from the wheels.

Fig. 4 is a perspective detail of said push rod, rock lever, and the front end of the hounds to which the arms of the lever are pivoted, this view showing the catch for holding the brake mechanism out of action when desired.

Fig. 5 is a perspective detail of one of the springs and its casing for inclosing and actuating the brake beam, the latter being shown in outline only.

The well known parts of the forward portion of the running gear of a wagon are designated in the drawings by letters, and no claim for novelty is made thereon. That is to say, the wheels W, which are the front wheels, are mounted on the opposite ends of the axle A upon which is secured the forwardly converging hounds H, between their front ends is mounted the tongue or pole P, D is the doubletree, S are the swingletrees connected with its extremities, and T are the traces. The bolster B is here shown as overlying the hounds and standing parallel with the axle and the wagon body (not shown) is carried by this bolster as usual. This specification is written on the assumption that two horses draw the vehicle, but it will be quite obvious that the doubletree here shown might be a swingletree, and the pole might be replaced by shafts by a slight modification of parts, which, however, constitute no feature of the present invention and therefore are not necessary to illustrate and describe in detail.

The brake mechanism proper includes a brake beam 1 slidably mounted near its ends in loop-shaped guides or casings 2 which are carried beneath the rear ends of the hounds, and having trunnions 3 at its extremities. On each trunnion is mounted a friction drum 4 having at its inner end a reduced hub or winding drum 5, and a chain 6 attached to and wound on the latter leads thence to a point 7 at the rear side of the axle A. Within each casing is an expansive spring 8 coiled on a guide rod 9 which leads from the brake beam out through an opening in the rear extremity of the casing, and the tendency of the two springs is to move the brake beam and its drums forward and to apply the latter to the tires of the wheels W with a force dependent upon the expansive strength of the springs. Thereafter, continued rotation of the wheels rotates the drums, and rotation of the drums rotates the winding drums or hubs 5 so that the chains are wound thereon until they become taut, and when they are taut they apply the friction drums with effective force to the tires of the wheels. Before the chains are taut, the contact of the drums 4 with the wheels is only such as brought about by the springs, and it is not effective for braking purposes because the drums rotate on the trunnions. I might here say that no matter which way these drums rotate—that is, whether the wheels rotate forward or backward—the slack of the chains is so little that only perhaps one complete rotation is necessary to bring the chains into action and effectively to apply the brake shoes, which latter are the drums 4 themselves.

The doubletree D is movably mounted on a plate overlying the front ends of the hounds and the rear end of the pole, and at the center of this doubletree is a forwardly elongated link 10 surrounding a pin 11 rising from said plate and permitting considerable forward and backward movement of the doubletree. Guides 12 may rise from this plate and extend over the doubletree at each side of its loop, their rear ends being connected with the hounds, and these guides prevent the tilting of the doubletree. Chains 13 connect the extremities of the doubletree with points 14 on the axle A to prevent excessive swing of the doubletree in case one horse should travel ahead of the other. In eyes 15 depending from the front end of the hounds is mounted a cross bar 16, and on the ends of the latter are mounted the arms 17 of a rock lever which is in U-shaped form, or in other words, the lower ends of said arms are connected by a cross bar, and the center of said cross bar is connected by a push rod 18 with the center of the brake beam 1, the push rod passing beneath the axle as indicated. One arm rises higher than the other and carries the foot piece 19 on which the operator may place his foot when desired, but both arms rise above the pivot of the rock lever to points forward of the doubletree D on opposite sides of its pivot which is the loop 10, and preferably on opposite sides of the front ends of the hounds and outside of the guides as shown.

A catch 20 is attached to one side of one of the hounds at a proper point so that its forward end may be thrown outward to hold the rock lever canted and the brakes out of action when desired. With this construction, the operation of my improvement is as follows: When the traces T are taut, the doubletree is drawn forward and the upper end of the rock lever is moved forward so that its lower end is moved rearward and the push rod pushes the brake beam to the rear and throws both drums 4 out of contact with the wheels. This condition of parts is maintained as long as the draft is exerted on either or both ends of the doubletree, but should one horse slacken his progress considerably or should both horses cease pulling the action will be as follows. The springs now expand and move the brake beam forward so that the drums 4 contact with the tires of the wheels. This causes the push-rod to move forward and the rock lever to turn on its pivot, with the result that the upper ends of its arms move backward as they are now permitted to do because tension on the traces T has been slackened and the doubletree D may move to the rear as the loop 10 permits. If this occurs when the vehicle is progressing uphill, cessation of draft on the traces will of course permit the wheels to turn backward and the vehicle to run down hill a little way. Such rotation will turn the drums 4, and these will turn the drums 5 and tighten on the chains so that the brakes will be automatically applied and the wagon will be held while the team rests. If this action should occur, however, when the wagon is moving down hill the same result will follow excepting that the rotation of the wheels W will turn the drums 4 in the opposite direction. In either case it will be observed that perhaps only one revolution of the drums 4 is necessary to tighten the chains and apply the brakes with considerable force. If it should happen that the driver checks the horses by drawing on the reins, as soon as the traces slacken the brakes are applied and the vehicle comes to rest before it can run onto the horses. As soon as they start up again, tension on the traces T moves the doubletree forward, and the rock lever and push rod throw the brakes out of contact with the wheels so that the horses have no braking action to overcome—on the contrary, should they start forward with a jerk, it is tempered to them by the existence of the springs. Should the operator at any time desire to throw the brakes off the wheels temporarily, he applies his foot to the foot piece. If he desires to throw the device out of action permanently, he applies the spring catch. Either action holds the rock lever tilted, and the push bar holds the brake beam to the rear and the brake drums 4 off the wheels.

What is claimed as new is:—

1. In an automatic brake, the combination with a brake beam having trunnions at its extremities, a friction wheel rotatably mounted on each trunnion and having a winding drum on its hub, the wheels standing opposite the vehicle wheels, guides in which said beam is movably mounted, and springs pressing the beam normally in a direction to apply the friction wheels to the wagon wheels; of a doubletree slidably and pivotally mounted on the running gear, means for connecting the traces with the doubletree, trip mechanism whereby forward movement of the doubletree relative to the running gear moves the brake beam against the tension of its springs and throws off the brakes, and chains connecting said winding drums with the axle.

2. In an automatic brake, the combination with a brake beam having trunnions at its extremities, a friction wheel rotatably mounted on each trunnion and having a winding drum on its hub, the wheels standing opposite the vehicle wheels, guides in which said beam is movably mounted, and springs pressing the beam normally in a direction to apply the friction wheels to the vehicle wheels; of chains connecting said winding drums with the axle, a push rod leading from the center of the brake beam forward, a rock lever pivoted between its ends to the running gear forward of the axle and to whose lower end said push rod is connected, and means actuated by tension on the traces for bearing the upper end of said rock lever forward, for the purpose set forth.

3. In an automatic brake, the combination with a brake beam having trunnions at its extremities, a friction wheel rotatably mounted on each trunnion and having a winding drum on its hub, the wheels standing opposite the vehicle wheels, guides in which said beam is movably mounted, and springs pressing the beam normally forward to apply the friction wheels to the vehicle wheels; of chains connecting said winding drums with the axle, a push rod leading from the center of the brake beam forward, a U-shaped rock lever whose arms are pivoted in an upright position astride the front ends of the hounds forward of the axle and whose connecting cross bar is pivotally connected with the front end of said pushrod, and a whiffle tree pivotally and slidably mounted on the hounds in rear of the upper ends of said arms and adapted to press said ends forward when the traces are under tension.

4. In an automatic brake, the combination with a slidable brake beam, rolling brakes mounted thereon adjacent the wheels of the vehicle and each having a winding drum, yielding means bearing said beam in a direction to apply the brakes, and chains connecting the winding drums with the front axle; of a U-shaped rock lever whose arms are pivoted to opposite sides of the hounds forward of said axle, a pushrod connecting the cross bar at the lower ends of said arms with the center of said brake beam, the upper end of one arm having a foot piece, and a double tree slidably mounted on said hounds in rear of the upper ends of said arms and adapted to press them forward when the traces are under tension.

5. In an automatic brake, the combination with a slidable brake beam, rolling brakes mounted thereon adjacent the wheels of the vehicle and each having a winding drum, yielding means bearing said beam in a direction to apply the brakes, and chains connecting the winding drums with the front axle; of a U-shaped rock lever whose arms are pivoted to opposite sides of the hounds forward of said axle, a pushrod connecting the cross bar at the lower ends of said arms with the center of said brake beam, a catch carried by one of said hounds and adapted to engage the upper end of one arm, and a double tree slidably mounted on the hounds in rear of said arms and adapted to bear their upper ends forward when the traces are under tension.

In testimony whereof I affix my signature.

CHARLES H. KILGORE.

Copies of this patent may be obtained for five cents each, by addressing the "Commissioner of Patents, Washington, D. C."